US006781785B2

(12) United States Patent
Belser et al.

(10) Patent No.: US 6,781,785 B2
(45) Date of Patent: Aug. 24, 2004

(54) METHOD AND SYSTEM FOR UTILIZING CIRCULAR MARKS IN POSITION ERROR SIGNAL PATTERNS

(75) Inventors: Karl A. Belser, San Jose, CA (US); Li-Ping Wang, Fremont, CA (US); Terry W. McDaniel, Morgan Hill, CA (US)

(73) Assignee: JPMorgan Chase Bank, New York, NY (US)

( * ) Notice: Subject to any disclaimer, the term of this patent is extended or adjusted under 35 U.S.C. 154(b) by 496 days.

(21) Appl. No.: 09/726,965

(22) Filed: Nov. 29, 2000

(65) Prior Publication Data

US 2001/0033453 A1 Oct. 25, 2001

Related U.S. Application Data

(60) Provisional application No. 60/167,946, filed on Nov. 29, 1999.

(51) Int. Cl.$^7$ ............................................... G11B 5/596
(52) U.S. Cl. ................................ 360/77.03; 360/77.08; 369/44.26
(58) Field of Search ........................... 360/77.03, 77.08; 369/44.26, 43

(56) References Cited

U.S. PATENT DOCUMENTS

| 4,558,383 A | * | 12/1985 | Johnson .................... 360/77.03 |
| 5,296,995 A | * | 3/1994 | Yonezawa et al. ........... 360/135 |
| 5,473,480 A | * | 12/1995 | Ishida .......................... 360/51 |
| 5,815,485 A | * | 9/1998 | Tanaka et al. ............ 369/275.3 |

* cited by examiner

*Primary Examiner*—David Hudspeth
*Assistant Examiner*—Jason Olson (57) ABSTRACT

Marks with curved edges are used in data patterns and sensed with proximity recording. Circular, elliptical, and oval marks are examples of marks with curved edges that can be used in the present invention. The marks with curved edges are used to define data patterns (e.g. position error signal patterns) as a function of radius. If the marks with curved edges have been recorded longitudinally, an amplitude of a read back signal, such as a peak amplitude, is determined in order to generate a position error signal. If the marks with curved edges have been recorded vertically, an area under the curve of the read back signal is determined in order to generate a position error signal.

24 Claims, 10 Drawing Sheets

METHOD AND SYSTEM FOR UTILIZING CIRCULAR MARKS IN POSITION ERROR SIGNAL PATTERNS

CROSS-REFERENCE TO RELATED APPLICATIONS

This application is related to and claims the benefit of commonly assigned U.S. Provisional Application No. 60/167,946, filed on Nov. 29, 1999 and entitled "Photo Servo Printing Method Used To Print Guide Patterns For Pattern Assisted Self Servo Writing." The subject matter of this related application is incorporated herein by reference.

BACKGROUND OF THE INVENTION

1. Field of the Invention

The present invention relates to data storage systems, and more particularly data patterns in data storage systems. Still more particularly, the present invention relates to a method and system for utilizing circular marks in position error signal patterns.

2. Description of the Prior Art

Designers, manufacturers, and users of computing systems require reliable and efficient digital information storage and retrieval equipment. Conventional data storage devices, such as magnetic disk drive storage systems, are typically used and are well known in the art. As the amount of information that is stored digitally increases, however, users of magnetic recording media need to be able to store larger and larger amounts of data in the recording media. To meet this demand, designers of magnetic recording media are working to reduce the size of the features on a storage disk.

One technique used to create smaller format patterns is proximity recording. Proximity recording is determined by the proximity of the recording head to the storage media, with magnetic recording being one example of proximity recording. Typically, marks formed by proximity recording can be located closer to each other than they can with far field recording. This is due to the fact that the width of the write head determines the width of the marks. And future magnetic write heads may reach dimensions as small as one hundred nanometers long by forty nanometers wide.

In conventional data storage systems, such as hard disk drives, write heads are rectangular shaped, which results in marks that are similarly shaped. Magnetic marks are best written with straight, radial edges because it makes it easier for the head to read the bits. But it is difficult to write rectangular marks close together due to the fringe fields created by a write head. When a write head is writing marks on one track, the fringe fields can partially erase the marks stored on adjacent track. This can cause the written rectangular marks to have curved ends, and curved ends make it more difficult to read the magnetic marks.

SUMMARY

The present invention overcomes the limitations of the prior art by providing a method and system for using marks with curved edges in data patterns such as position error signal patterns, and sensing these marks with proximity recording heads. Circular, elliptical, and oval marks are examples of marks with curved edges that can be used in the present invention. The marks with curved edges are used to define data patterns (e.g. position error signal patterns) as a function of radius. If the marks with curved edges have been recorded longitudinally, an amplitude of a read back signal, such as a peak amplitude, is determined in order to generate a position error signal. If the marks with curved edges have been recorded vertically, an area under the curve of the read back signal is determined in order to generate a position error signal.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

FIG. 2(*a*) is a diagram depicting a surface of an exemplary storage disk;

FIG. 2(*b*) is a linearized diagram of an exemplary sector illustrated in FIG. 2(*a*);

FIG. 7(*a*) depicts a patterned media that has been fabricated using one exemplary fabrication method;

FIG. 7(*b*) illustrates a patterned media that has been fabricated using an alternative exemplary fabrication method;

FIG. 7(*c*) depicts a patterned media that has been fabricated using another alternative exemplary fabrication method.

DETAILED DESCRIPTION

To facilitate an understanding of the present invention, it is described hereinafter in the context of a specific embodiment. In particular, reference is made to the implementation of the invention in a magnetic hard disk drive. It will be appreciated, however, that the practical applications of the invention are not limited to this particular embodiment. Rather, the invention can be employed in other types of data storage systems that utilize marks in or on a storage medium to store data, one example being a magneto-optical disk drive.

Figure 1:
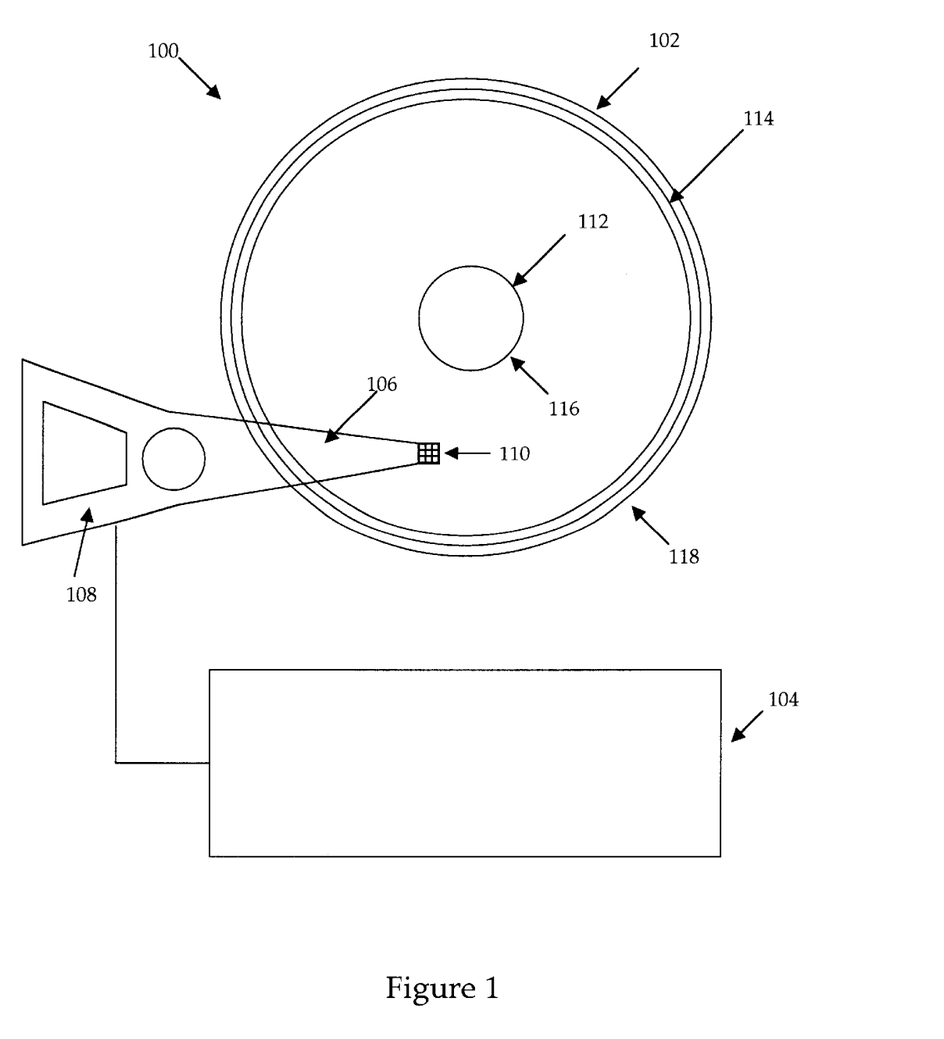
FIG. 1 is a diagram illustrating a data storage system that can be used with the present invention.

With reference now to the figures and in particular with reference to FIG. 1, a data storage system that can be used with the present invention is shown. Data storage system 100 in this exemplary embodiment is a hard disk drive system. Data storage system 100 includes one or more storage disks 102, a storage system controller 104, an actuator 106, a voice coil motor 108, a recording head 110, and a rotating spindle 112. The recording head 110 is comprised of at least one read head and at least one write head, and is positioned at the end of actuator 106 which is moved via voice coil motor 108. The recording head 110 transfers data between storage system controller 104 and a specific physical location on storage disk 102. Data is preferably stored in many approximately consecutively numbered concentric rings or "tracks" 114 on recording disk 102. For clarity, only two tracks 114 are shown in FIG. 1. The tracks are displaced radially from each other, beginning at the inner diameter 116 of the disk 102 and continuing to the outer diameter 118 of the disk 102.

Storage system controller 104 may randomly access a specific logical location on storage disk 102 via a particular track address and a particular sector address. Tracks 114 are very closely spaced in order to maximize storage capacity and economy. The mechanical precision of the movement of storage disk 102 and the movement of recording head 110 is critical to accessing the proper data storage location on storage disk 102. Storage system controller 104 thus requires some means for precisely positioning recording head 110 quickly and accurately over tracks 114 for subsequent storage and retrieval operations.

Figure 2A:
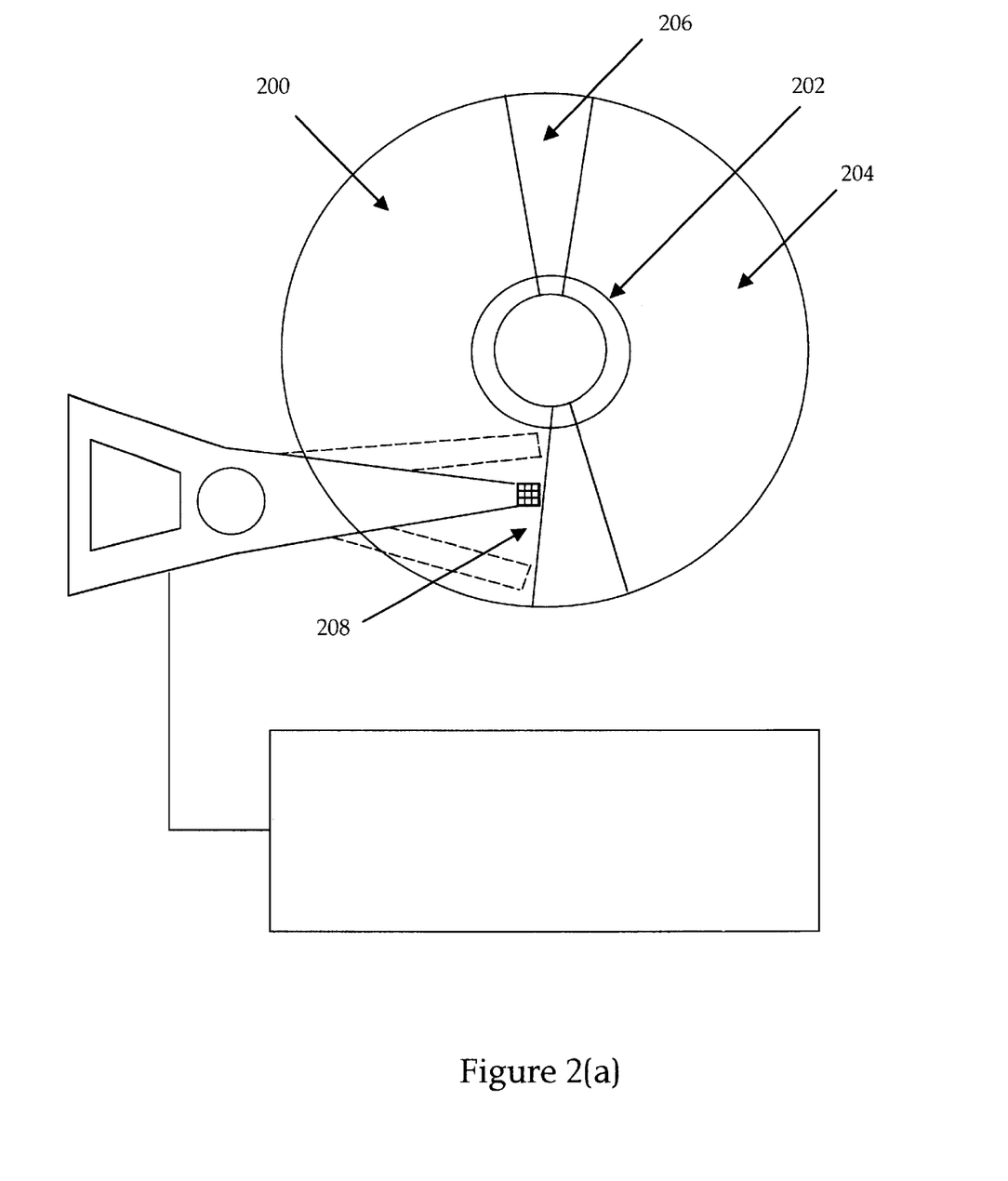
Figure 2B:
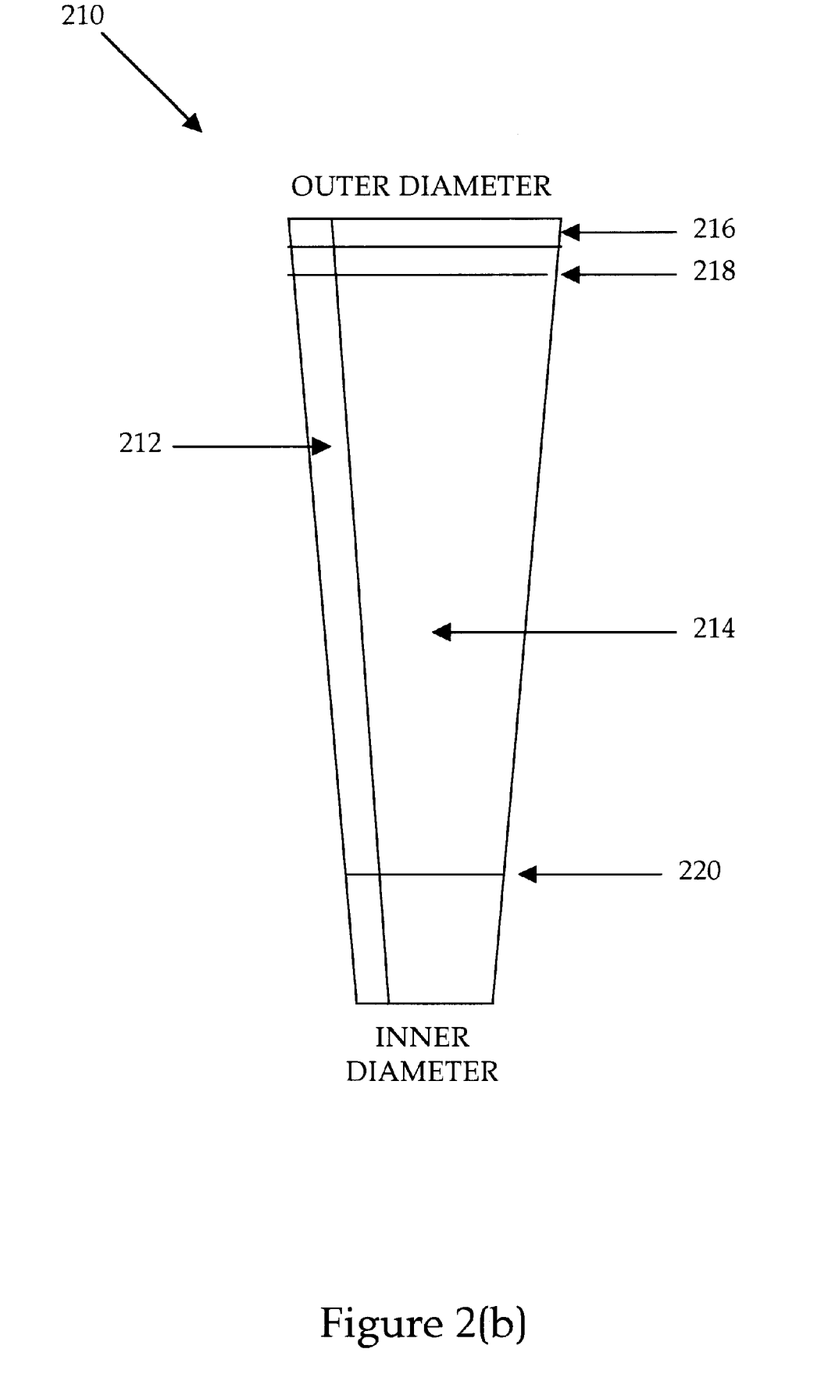

FIG. 2(a) is a diagram depicting a surface of an exemplary storage disk. The surface 200 of storage disk 102 typically includes a landing zone 202, a useable data zone 204, arc-shaped sectors 206, and an arc-shaped path 208 taken across the surface 200 by recording head 110. A linearized diagram of an exemplary sector 206 is shown in FIG. 2(b). Sector 210 includes a servo sector 212, a data wedge 214, a pair of neighboring numbered concentric tracks 216 and 218, and a border 220 between landing zone 202 and useable data zone 204. Data wedge 214 includes stored user data, while servo sector 212 includes address and alignment information (e.g. servo marks) used by the disk drive system.

Figure 3:
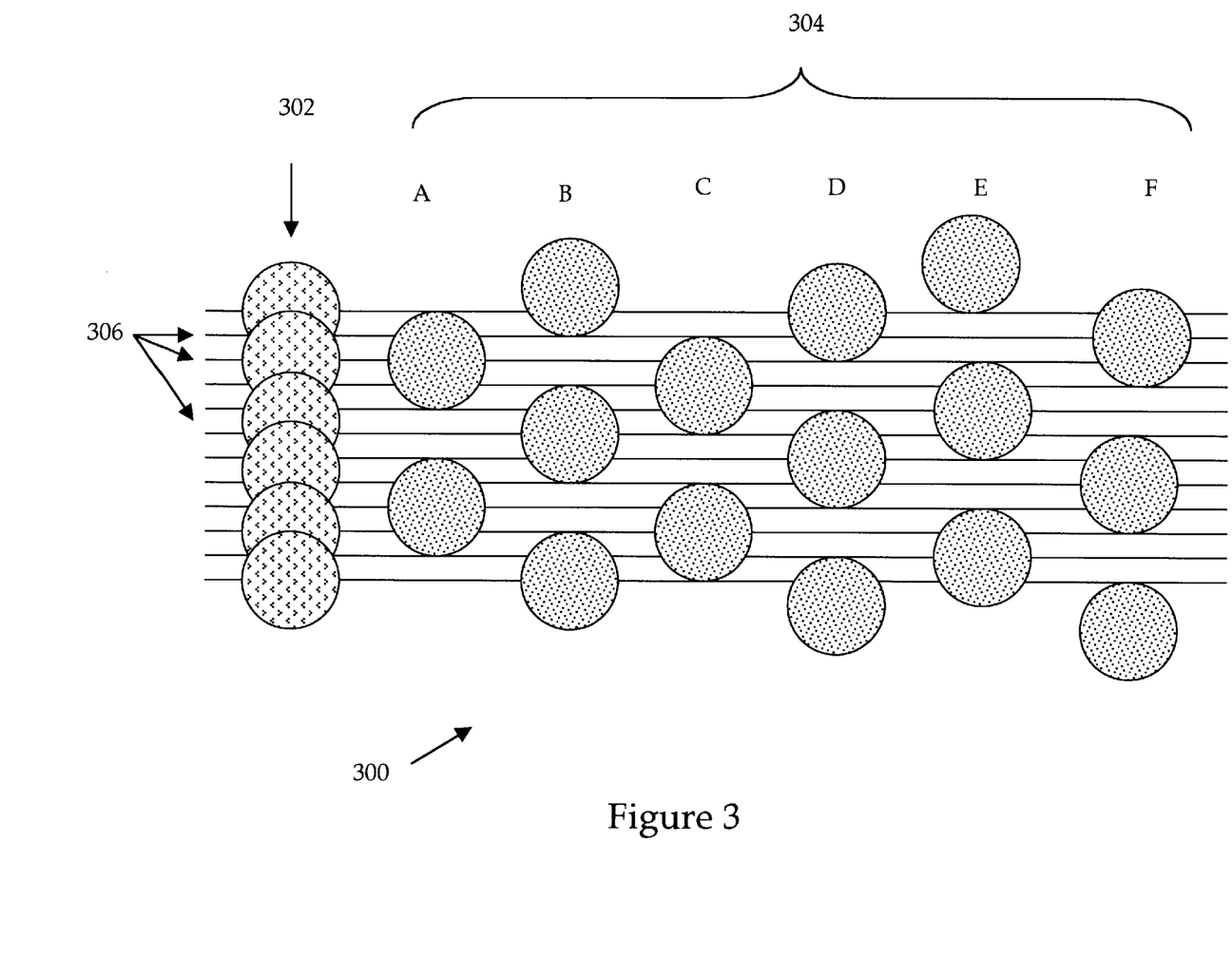
FIG. 3 depicts an exemplary data pattern that can be used with the present invention.

Referring to FIG. 3, an exemplary data pattern that can be used with the present invention is shown. In the exemplary embodiment, the data pattern is comprised of a servo pattern that is used to determine a position error signal. Servo pattern 300 includes a sync 302 and a plurality of servo marks 304. The horizontal lines 306 depict the center of the tracks.

In this exemplary embodiment, the servo marks 304 form a six-phase pattern including an A mark, a B mark, a C mark, a D mark, an E mark, and a F mark. Each of the A, B, C, D, E, and F marks are repeated eight times in order to obtain an adequate SNR from the peak (longitudinal) or integral (vertical) amplitude measures. The six amplitude measures A, B, C, D, E, and F are used to generate three non-normalized PES waveforms: PES1=A−B, PES2=C−D, and PES3=E−F. One method to normalize these PES waveforms is to divide each by the sum of the three waveforms (SUM=PES1+PES2+PES3).

The sync 302 and the servo marks 304 in this exemplary embodiment are recorded with optical recording, thereby creating marks having curved edges on or in a surface of a storage medium. Circular, oval, and elliptical marks are examples of markings having curved edges that can be used with the present invention. Additionally, the fabricated servo pattern comprises the final PES pattern. The marks with curved edges define the position error signal as a function of radius.

In an alternative embodiment, the servo marks 304 comprise a guide pattern that is used to perform a self-servo writing process. The guide pattern is used to determine the repeatable errors (e.g. eccentricity) and then determine correction factors for the final PES pattern. In this way, the final PES pattern can be written as concentric circles on the disk (concentric from the center of the disk or concentric with respect to the center of balance of the disk).

The servo marks 304, however, are not limited to a six-phase pattern. Those skilled in the art will appreciate that other patterns can be used with the present invention. Amplitude patterns (e.g. null pattern, split burst pattern) and other phase patterns, such as two-phase and three-phase patterns, can be used with the present invention. Additionally, the present invention is not limited to forming the marks with optical recording. Any fabrication process can be used that creates marks having curved edges.

Figure 4:
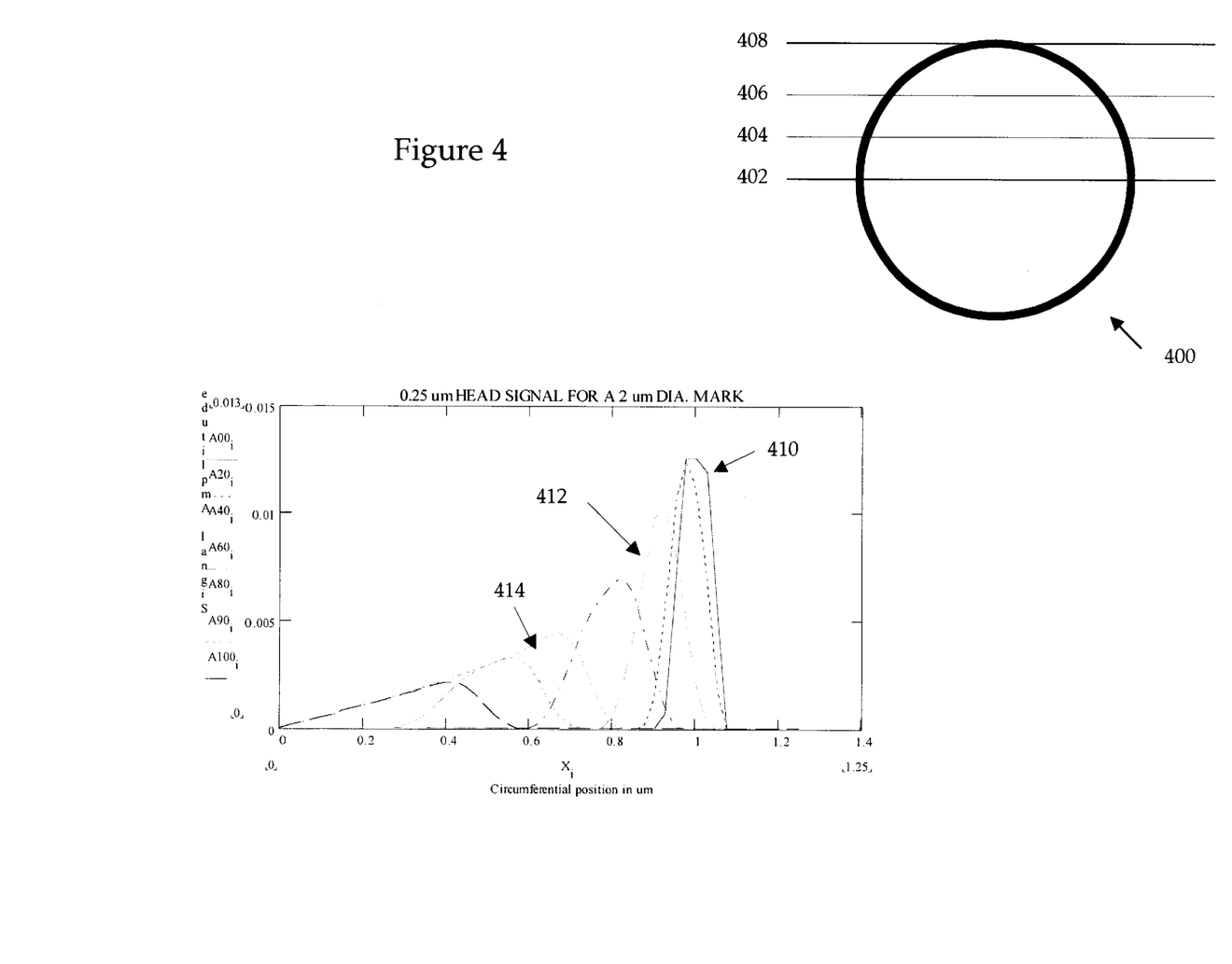
FIG. 4 is a diagram illustrating an exemplary mark and exemplary read back signals according to the present invention.

Referring to FIG. 4, a diagram of an exemplary mark and exemplary read back signals according to the present invention are shown. In this exemplary embodiment, the mark 400 has been recorded using a longitudinal recording method. With longitudinal recording, the marks are recorded in a direction that is parallel to the surface of the media.

Four separate exemplary tracks 402, 404, 406, 408 are shown in FIG. 4. Track 402 lies over the center of the mark 400. Tracks 404 and 406 are located off-center of the mark 400, and track 408 lies at the edge of the mark 400. When the proximity recording head passes over mark 400, a read back signal is obtained. In this example, the read back signal reaches its highest amplitude on track 402. Curve 410 in the illustrated graph is an example of a read back signal sensed by the proximity recording head as it travels along track 402. The read back signal on track 404 does not have as large an amplitude as the signal from track 402, but it has a wider pulse (see curve 412). The read back signal on track 406 does not have as large an amplitude as the signal from track 404, but it has a wider pulse (see curve 414). Finally, the read back signal is minimal or nonexistent on track 410.

The magnetic charge at various paths is the same (or the area under the curve), but the flux density is spread out differently along the curved edges of the mark 400 (e.g. curves 410, 412, 414). In this example, the peak amplitude of the read back signal from a particular track is determined in order to generate a position error signal (PES).

Figure 5:
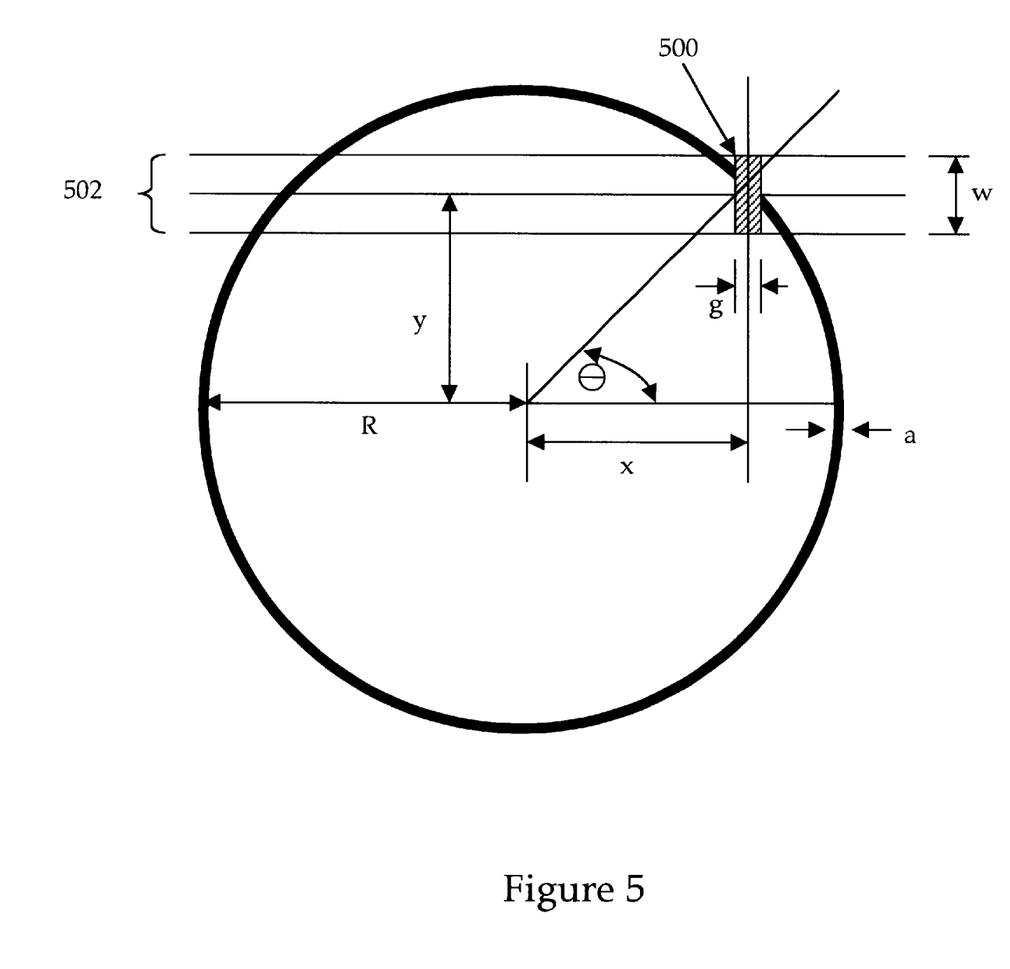
FIG. 5 is a diagram depicting an exemplary method for calculating an amplitude for a read back signal according to the present invention.

FIG. 5 is a diagram depicting an exemplary method for calculating an amplitude of a read back signal according to the present invention. In this example, the mark has been written with optical recording using longitudinal recording in the reverse magnetization direction from that of a pre-magnetized disk. Consequently, the magnetic charge distribution around the rim of the mark will be sinusoidal. The charge distribution may manifest itself as either a change in the north-to-north pole transition width or as the magnetic field amplitude.

The signal read from the mark can be calculated by integrating the flux sensed by the head. In the exemplary embodiment shown in FIG. 5, a proximity recording head 500 (e.g. magnetic recording head) is shown at a particular location on a track 502 over the mark. The following equation is used in this example to determine the peak amplitude of the read back signal from the head.

$$A = \int_{\substack{overlap \\ area}} dA \cos\left(\arctan\frac{y}{x}\right)$$

A is the read back amplitude from the head, x is the distance from the center of the mark parallel to the track, and y is the distance from the center of the mark perpendicular to the track. The parameter "overlap area" is defined to mean the area overlap of the head footprint (area: w×g) with the circular annulus of width "a", where "a" is the width of the rim of the mark (or magnetic transition parameter). In general, then, the integral gets overlap contributions from the left and right halves of the circular annulus as the head moves along a track in the x-direction at fixed y. The element dA represents the infinitesimal area over which the integration occurs.

In the exemplary embodiment shown in FIG. 5, all of the measurements are in micrometers, with R=1.0 um, a=0.05 um, and g=0.1 um. The parameter w will vary from system to system. The magnetic charge at the rim of the mark is determined by the equation MC=MC(0)*cos(Θ), where theta represents the angle measured from the tangent to the track 502. The equation MC=MC(0)*cos(Θ) is the explanation for the cosine factor in the integrand of the signal amplitude expression.

Figure 6:
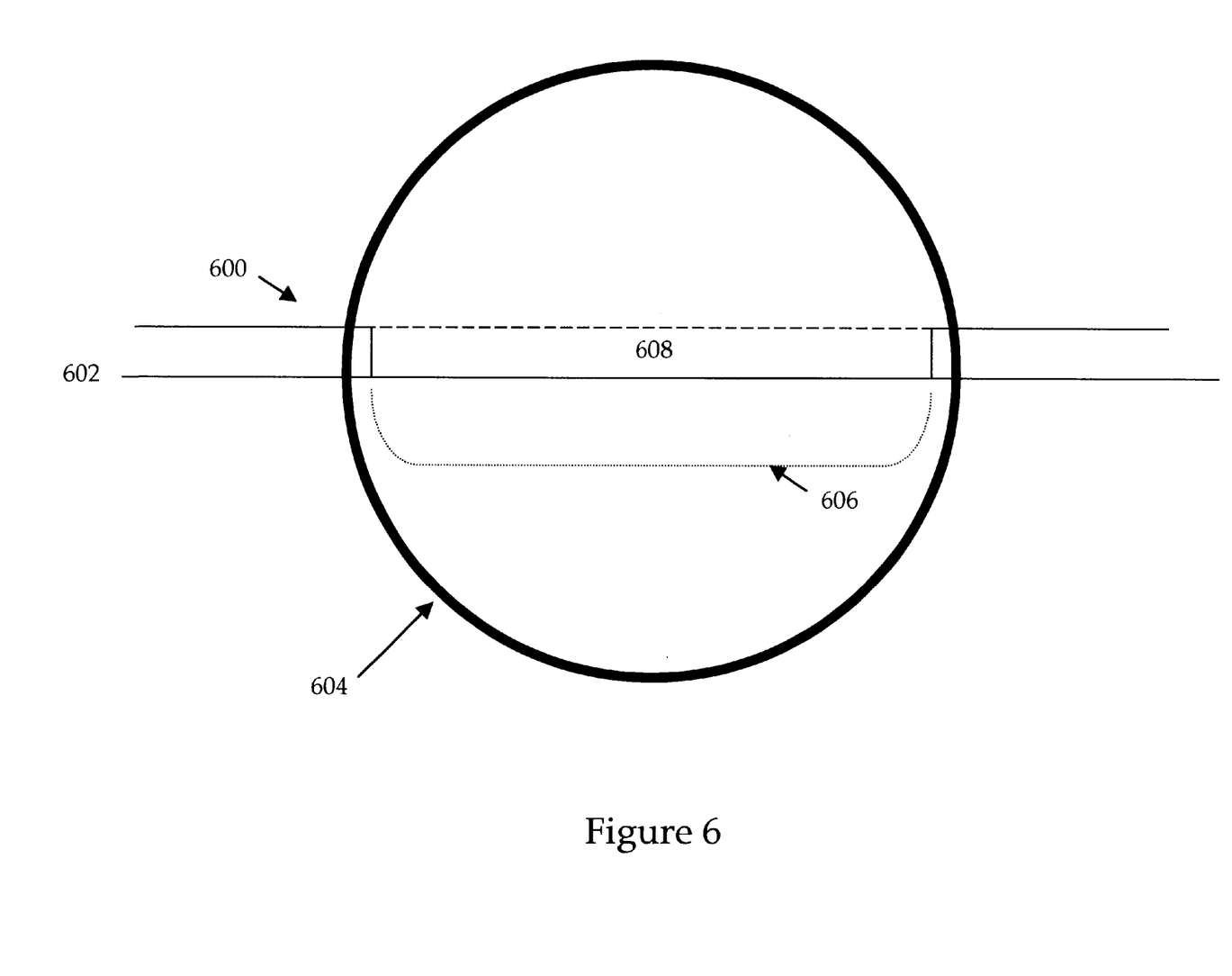
FIG. 6 is a diagram illustrating an exemplary mark and an alternative exemplary read back signal according to the present invention.

In an alternative embodiment, the marks are written using vertical recording. Marks written by vertical recording have a direction of magnetization that is perpendicular to the surface of a disk. The marks are recorded as up-down domains that have the opposite direction of magnetization of the surrounding media. FIG. 6 illustrates an exemplary mark and an alternative exemplary read back signal according to the present invention. The shape of the read back signal in this example is a rectangular signal 600 as the proximity head travels path 602 across the mark 604. Depending on the fabrication process used to form the mark 604, the read back signal 600 may include a negative signal, represented by the dotted line 606. With vertical recording, the area under the curve 608 (relative to the dashed line) is determined in order to generate a position error signal.

Figure 7A:
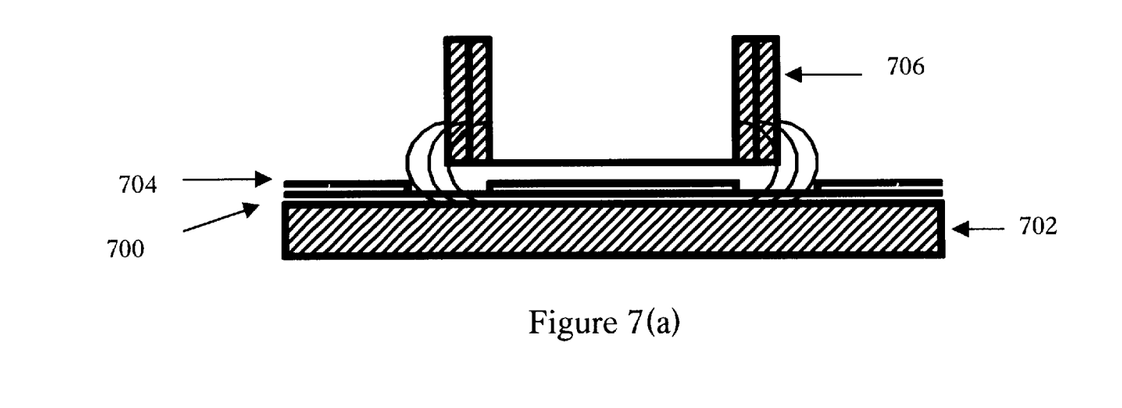
Figure 7B:
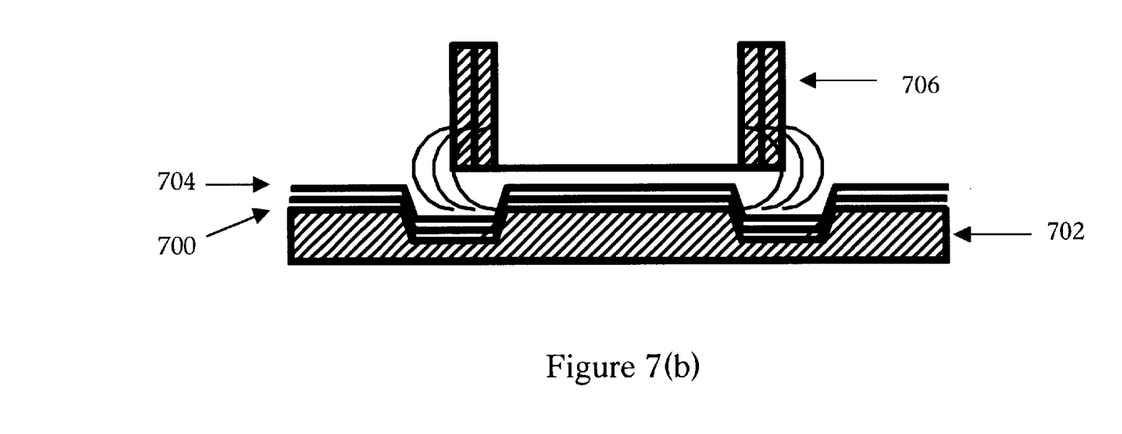

FIGS. 7(a)–7(b) are diagrams that will be used to describe alternate exemplary methods for producing patterned media according to the present invention. Both methods utilize a master to make a stamper. The master is created by first depositing a photoresist layer over a substrate. The photoresist material is then exposed to a pulsating electron or ion beam, where the pulsing of the beam is determined by the desired format pattern that is to be patterned into a magnetic media. The electron or ion beam has the ability to define very small features, and features as small as one hundred nanometers in size can be achieved with a deep UV machine, while features as small as ten nanometers can be obtained with a electron beam machine.

The stamper is then made from the master, and is a metal layer typically comprised of nickel. Because the photoresist layer is able to reproduce the format pattern accurately, the small format pattern is transferred faithfully to the stamper. In FIG. 7(a), a patterned media that has been fabricated using one exemplary fabrication method is shown. A first layer 700 is deposited over a substrate 702, followed by a recording layer 704. Typically, the first layer 700 is comprised of a chromium (Cr) layer, and the recording layer 704 is comprised of a cobalt chromium (CoCr) layer. Those skilled in the art will understand however, that other types of materials can be used for the first layer 700 and the recording layer 704.

A resist layer is then deposited over the recording layer (not shown). A stamper is then pressed into the resist layer in order to transfer a format pattern from the surface of the stamper into the surface of the resist layer. The stamper compresses some portions of the resist layer, while other portions retain their original thickness. After the stamper is removed, the compressed portions of the resist layer are etched away, until the underlying recording layer 704 is exposed. The etching process continues until portions of the recording layer 704 are removed, thereby creating regions that can not be magnetized. The remaining resist layer is then removed. The servo sector format on the patterned media is preferably defined by the edges of the recording layer 704. A read/write head 706 can then read from or write to the remaining recording layer 704.

FIG. 7(b) illustrates a patterned media that has been fabricated using an alternative exemplary fabrication method. A resist layer (not shown) is deposited over a substrate 702, and a stamper is pressed into the surface of the resist layer in order to transfer the format pattern from the surface of the stamper into the surface of the resist layer (not shown). The stamper compresses some portions of the resist layer, while other portions retain their original thickness. After the stamper is removed, the compressed portions of the resist layer are etched away, until the underlying substrate 702 is exposed. The etching process continues until a desired etch depth is reached in the substrate 702. Typically, an etch depth of fifteen to twenty-five nanometers is used.

The remaining resist layer is then removed, and a first layer 700 and recording layer 704 are deposited over the substrate. Both the first layer 700 and the recording layer 704 conform to the surface of the substrate 702, thereby creating a patterned media. The servo sector format for the patterned media is preferably defined by spacing loss.

Figure 7C:
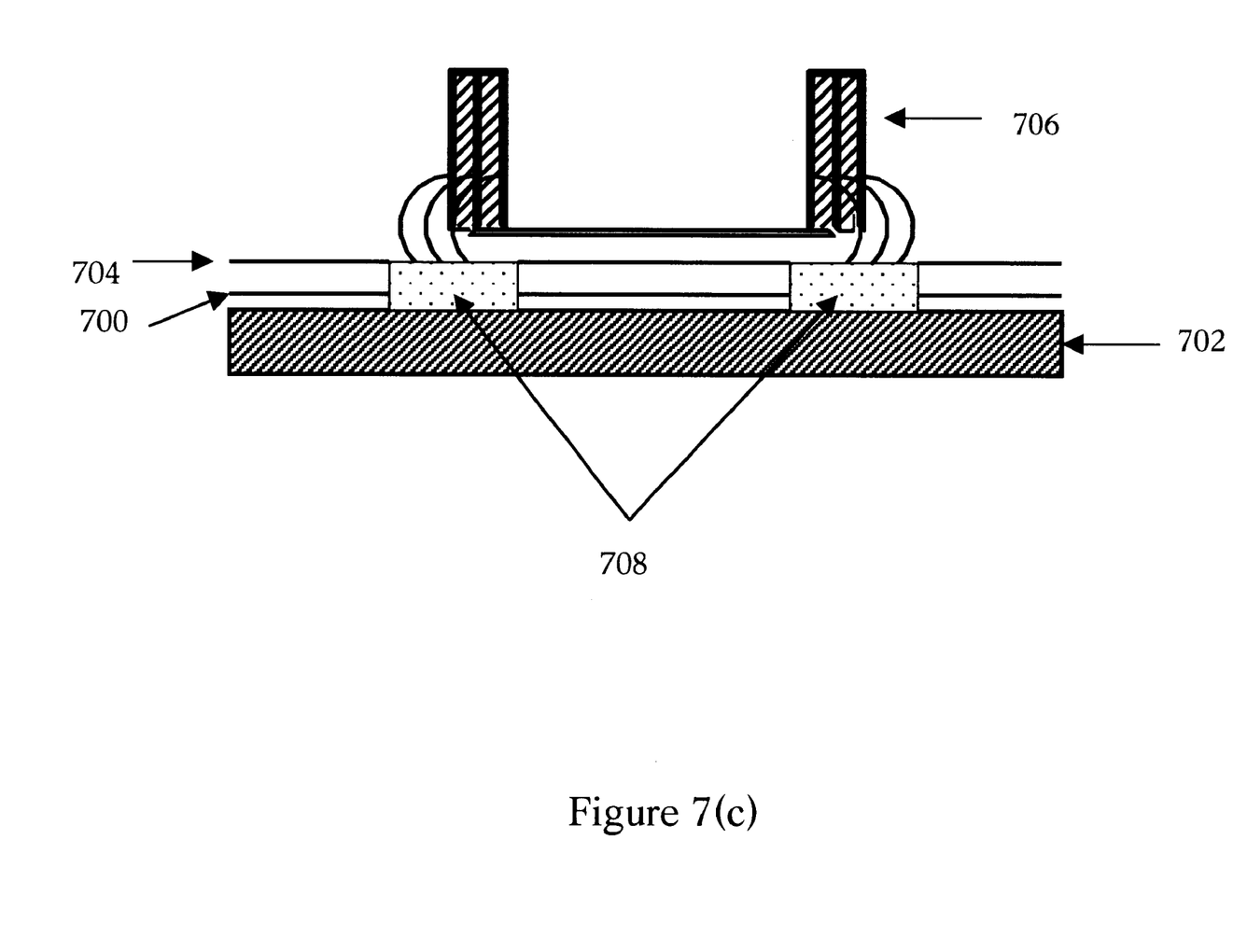

Referring to FIG. 7(c), a patterned media that has been fabricated using another alternative exemplary fabrication method is shown. In this example, ion-implantation is used to fabricate the marks. With ion-implantation, a first layer 700 and a recording layer 704 are deposited over a substrate 702. Regions 708 are then formed by implanting ions into particular areas in order to create regions that can not be magnetized.

Figure 8:
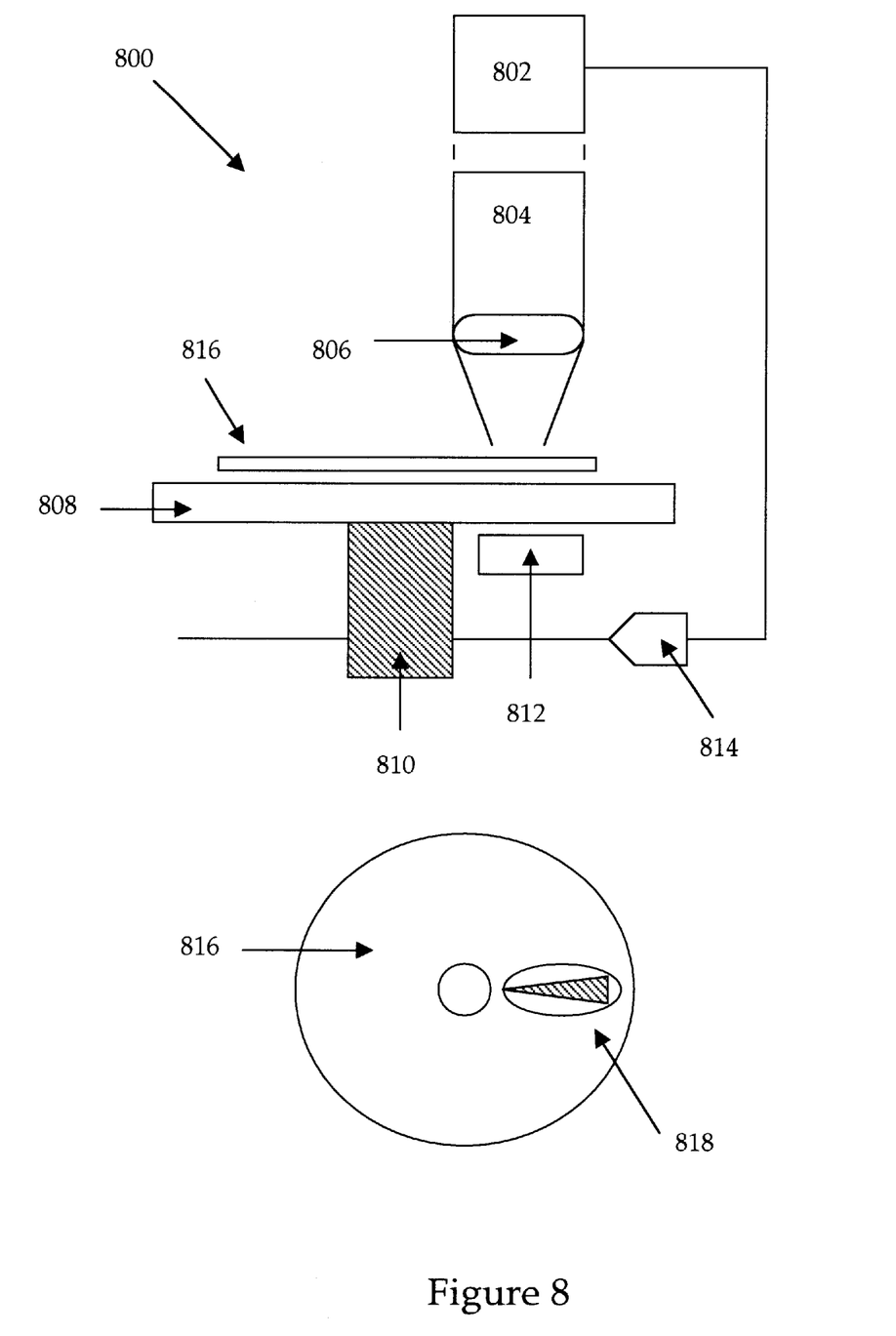
FIG. 8 is a diagram of an exposure station that may be used to fabricate a media.

FIG. 8 is a diagram of an exposure station that may be used to fabricate a media. In this example, the exposure station 800 is comprised of a pulsed laser source 802, a mask (e.g. 4×mask) 804, a lens 806, a turntable 808, a motor 810, a magnet 812, and an angle transducer 814. A storage medium (e.g. disk) 816 is placed on turntable 808. In this example, the exposure station fabricates the storage medium 816 using thermo-magnetic printing. The pulsed laser source 802 applies a short duration light pulse through the mask 804 to heat the media 816 in the presence of a magnetic field created by magnet 812. To record servo sectors 818 on the storage medium 816, the medium 816 is rotated (stepped) on the turntable 808 by motor 810. For individual marks, a magnetization is formed along the curved edges of the marks.

While the invention has been particularly shown and described with reference to a preferred embodiment, it will be understood by those skilled in the art that various changes in form and detail may be made therein without departing from the spirit and scope of the invention.

What is claimed is:

1. A data pattern for a data storage device that uses at least one proximity recording head to read at least a portion of the data pattern, wherein the data pattern comprises a plurality of marks having curved edges and a magnetic orientation such that a position error signal is derived in relation to an area of a curve of a read back signal transduced from said pattern.

2. The data pattern of claim 1, wherein the plurality of marks having curved edges are formed by optical recording.

3. The data pattern of claim 1, wherein the data pattern is located in at least one servo sector on a data storage medium.

4. The data pattern of claim 3, wherein the data pattern comprises a plurality of servo marks that form a servo pattern.

5. The data pattern of claim 4, wherein the plurality of servo marks define the position error signal as a function of radius.

6. The data pattern of claim 5, wherein the plurality of servo marks are recorded vertically so that the magnetic orientation extends into the medium substantially normal to a direction of rotation of the medium.

7. The data pattern of claim 1, wherein the at least one proximity recording head comprises at least one magnetic recording head.

8. The data pattern of claim 1, wherein the data storage device comprises a hard disk drive.

9. The data pattern of claim 1, wherein the plurality of marks having curved edges comprise a plurality of circular marks.

10. The data pattern of claim 1, wherein the plurality of marks having curved edges comprise a plurality of oval marks.

11. The data pattern of claim 1, wherein the plurality of marks having curved edges comprise a plurality of elliptical marks.

12. A data storage device, comprising:
a storage medium having a plurality of marks having curved edges for storing data; and
at least one proximity recording head to read at least a portion of the plurality of marks with curved edges to generate a read back signal, wherein the data storage device generates a position error signal in relation to an area of a curve of said read back signal.

13. The data storage device of claim 12, wherein the plurality of marks having curved edges are formed by optical recording.

14. The data storage device of claim 12, wherein the data pattern is located in at least one servo sector on the storage medium.

15. The data storage device of claim 14, wherein the data pattern comprises a plurality of servo marks that form a servo pattern.

16. The data storage device of claim 15, wherein the plurality of servo marks define the position error signal as a function of radius.

17. The data storage device of claim 16, wherein the plurality of servo marks are recorded vertically so as to have a magnetic orientation that extends into the medium substantially normal to a direction of rotation of the medium.

18. The data storage device of claim 12, wherein the at least one proximity recording head comprises at least one magnetic recording head.

19. The data storage device of claim 12, wherein the data storage device comprises a hard disk drive.

20. The data storage device of claim 12, wherein the plurality of marks having curved edges comprise a plurality of circular marks.

21. The data storage device of claim 12, wherein the plurality of marks having curved edges comprise a plurality of oval marks.

22. The data storage device of claim 12, wherein the plurality of marks having curved edges comprise a plurality of elliptical marks.

23. A method for obtaining data from at least one mark having curved edges on a storage medium, the method comprising:
reading the at least one mark with a proximity recording head to obtain a read back signal; and
determining a position error signal in relation to an area of a curve of the read back signal.

24. The method of claim 23, further comprising the step of forming the at least one mark having curved edges with optical recording.

* * * * *

UNITED STATES PATENT AND TRADEMARK OFFICE
CERTIFICATE OF CORRECTION

PATENT NO. : 6,781,785 B2
DATED : August 24, 2004
INVENTOR(S) : Karl A. Belser et al.

It is certified that error appears in the above-identified patent and that said Letters Patent is hereby corrected as shown below:

Title page,
Item [73], Assignee, replace "JPMorgan Chase Bank, New York, NY (US)" with
-- Seagate Technology LLC, Scotts Valley, CA (US) --.

Signed and Sealed this

Fifth Day of October, 2004

JON W. DUDAS
*Director of the United States Patent and Trademark Office*